Patented Aug. 9, 1938

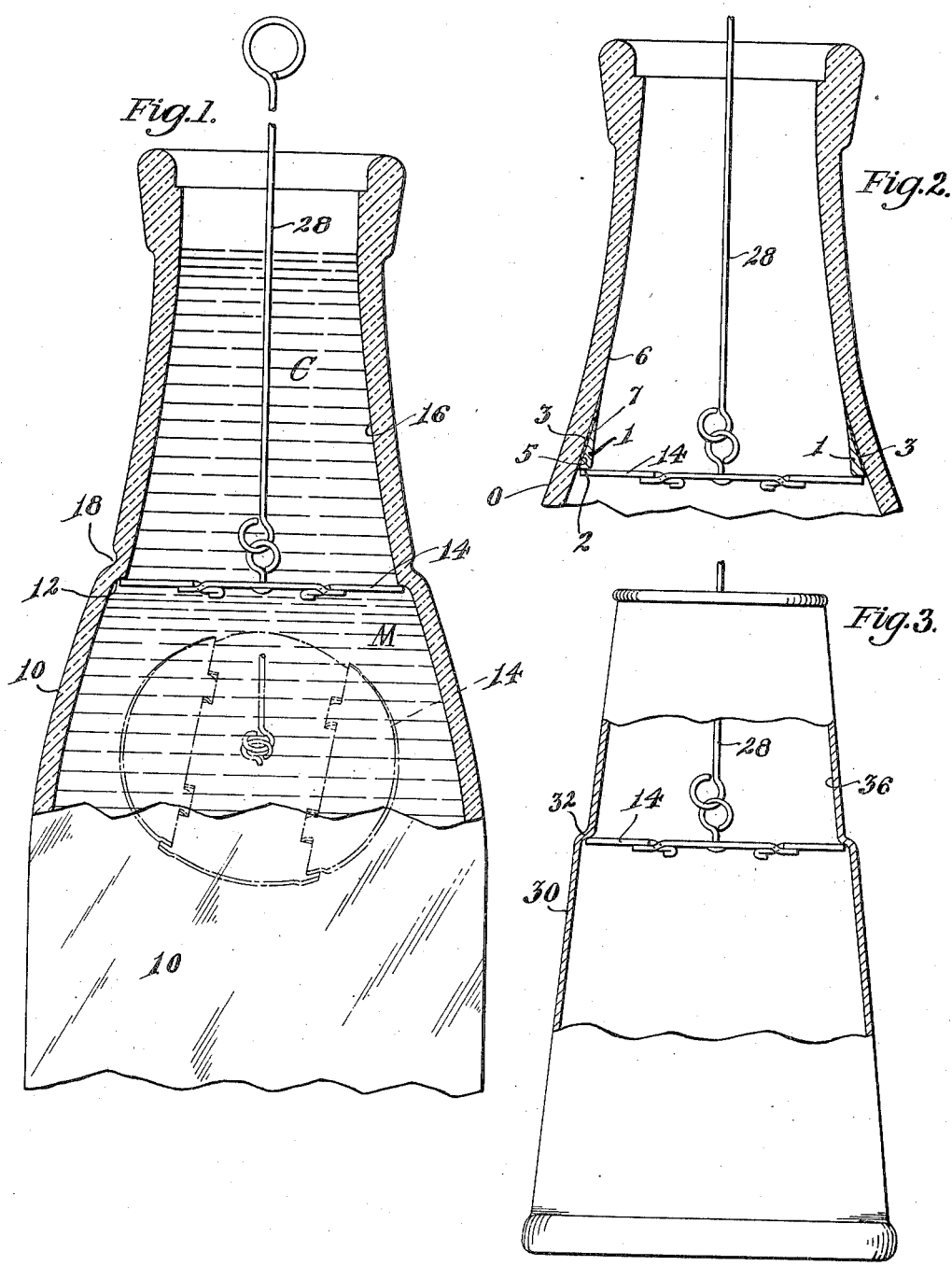

2,126,655

UNITED STATES PATENT OFFICE 2,126,655

COMBINED MILK AND CREAM CONTAINER AND SEPARATOR

John B. Neal, Allston, Mass., assignor of thirty-seven and one-half percent to Fredrick H. McAdams, Revere, Mass., and twenty-five percent to Everett E. Kent, Newton, Mass.

Application December 7, 1937, Serial No. 178,513

3 Claims. (Cl. 210—51.5)

This invention provides an improved combined milk and cream container and separator.

It relates to devices for domestic use in holding back milk, while pouring cream which has risen from it in a bottle or the like container of milk such as is customarily used for home deliveries and for sales by retail stores.

The prior proposals which appear nearest to being acceptable for the partitioning of milk from cream which is being poured, have been of two types. One, illustrated by the patent to W. S. Gray 960,894 of 1910, inserts a large disk into a milk bottle of conventional shape, the disk being collapsible to go down through the bottle mouth, and being hung loosely on the end of a handle wire. This disk is to be inserted edgewise to the approximate bottom level of the cream, and then has to become a partition by being expanded, tipped to horizontal, and pulled upward against the sloping upper walls of the bottle. If not pulled exactly perpendicular to the axis of the bottle it will not be tight. The difficulty of manipulating this to find a seat sufficiently tight to prevent outflow of milk, the disk being invisible and difficultly controllable within the opaque milk, is perhaps the reason why this device is not extensively in use.

The other type, shown in the Henderson Patent 1,528,480, provides a disk stopper, stiffly held on a stem and operates inward. This requires the bottle walls to be built with an annular re-entrant angle, down against whose upper side the stopper disk can be pushed. The making of this re-entrant annular angle involves that the neck walls above should bulge out to greater diameter than the restricted passage constituted by the annular apex of this re-entrant angle. In the daily mechanical cleaning of such bottles at a dairy, there is difficulty in making the cleaning implements reach the top part of the body wall below the restricted passage. Abrasion results; the glass becomes ground away along the re-entrant ridge; and this gives to the bottle a repulsive aspect of being not clean. Also, the joint presence of the bulge in its neck and the restriction at a high level below its neck makes some difficulty in the filling of the bottle. Also, when contents are poured from such a bottle an annoying gulping noise is heard. Another complaint is that there is a tendency toward splashing.

The ready market in numerous homes for a good, rapidly operable, cream partition has led to much striving by inventors, without as far as I know producing any device which is really satisfactory for this purpose, until my present disclosure, which avoids all of the said objections of each type. The purpose of this invention is to provide for the easy manipulating of a temporary partition to a seat at a predetermined place under the surface of the cream, notwithstanding that the partition and the seat are invisible under the milk. Also, when the bottle is inverted for the pouring, to cause the weight of the milk to be applied as a partition-holding and closure-tightening force, instead of its being a force tending to displace the partition. The invention provides a structure on the conical interior face of the bottle wall, with a surface facing downward in a horizontal plane at the desired level, this surface preferably having a flat portion, to serve as a seat for the flat edge portion of the partition disk. Without requiring any pronounced fold in the glass, and having no upward-facing ledge surmounted by a bulge of the neck, the combination of the invention provides in the bottle a mere undercut plane shoulder of downward-facing ledge, in the nature of a rebate. Below this rebate the bottle wall may continue to spread in diameter. Above this rebate the neck merely diminishes toward the mouth. Thus is eliminated the inturned ridge which so easily becomes abraded. The expanded plane partition overlaps the rebate in diameter, and therefore easily finds the plane of the annulus when being manipulated to its seat. When the bottle is inverted for pouring cream, the weight of the milk which is in the body of the bottle maintains the closure of overlapping plane against rebate shoulder. This simplifies the manipulation required for successful separating. Also it makes it easier for the operator to hold the disk separator while tipping the bottle over. The affirmative advantage results, over each said prior type, that the device can be used successfully by children and other less expert persons in the home.

Constructions embodying these and the other advantages which are characteristic of the invention are shown in the accompanying drawing, both for glass and for paper bottles, which are to be considered illustrative of the invention, rather than definitive; and it is intended that the patent shall cover, by suitable expression in the appended claims, whatever features of patentable novelty exist in the invention disclosed.

In the drawing:

Figure 1 is an elevation, with part broken away, of a milk bottle wherein features of the invention are combined, with liquid-parting partition being shown in full lines in operative position, and shown in dotted lines in an inoperative position through which it may pass when being inserted or removed;

Figure 2 is a similar view showing application of the invention to a milk bottle of conventional style as hitherto commonly used; and Figure 3 is an elevation, with part broken away, of a milk bottle made of paper, having features of the invention combined therein.

The general principle of the invention is illustrated in Figure 2. An annular body 1 of rubber or other suitable material, having a triangular cross section, is inserted, while it is flexible, into a glass milk bottle O of usual style and shape, and, having been made of diameter to fit at the level desired for the separating of contents to occur, it is there secured on the glass by cement 3 or other suitable method. The cross section of this annulus is shaped so that the outer face 5 of the annulus stands at such an angle to the axis that it will be parallel to the inner face 6 of the bottle where it is to be attached. The inner face 7 of the annulus runs at such an angle to the axis that at its upper edge it will be approximately tangent to the conical glass face 6 of the neck, making there a thin angle with the outer face 5 of the annulus. The bottom of the annulus has the face 2 which is to constitute a downward facing ledge to afford a seat for the partition 14. This seat should be made to lie in a plane perpendicular to the axis; and preferably the seat-face 2 is flat.

With the modern prevalence of making milk in a standard composition, domestic deliveries contain approximately a certain known proportion of cream; and the bottom of the floating cream in a bottle stands at approximately uniform height for all bottles of the same kind and size. The body constituting the internal seat may be fused or adhered to the glass at this level as in Figure 2, or be integral with the bottle wall, as in Figures 1 and 3.

Bottles which are opaque, as paper bottles, can be made with a shape which shows exteriorly the level of the cream-milk dividing plane, and thus shows to the user approximately how much quantity of cream is within the opaque bottle, the said shape also affording interiorly the seat for the removable partition which is to constitute a sort of valve or flow-barrier plate, to separate this cream from the milk. Such a construction is shown in Figure 3 where a slight annular jog 32 making a rebate of the paper wall 30 accomplishes both of these functions. The same idea is applicable in glass bottles, and Figure 1 shows one such, 10, at 12 with its valve 14. In all cases the bottle neck 6, 16, 36 increases progressively in diameter from the region of its delivery mouth, along the cream portion C, to the full width of body of bottle holding the milk portion of the liquid, i. e., without there being any substantial diminution of diameter of passage from the mouth inward past the ledge. Thus the bottle has no inside projection facing toward the mouth. This provides an unobstructed passage, through which a collapsed partition may be inserted quickly and easily, to be expanded below. Also it permits bottle-cleaning apparatus to reach into the bottle and effectively clean all interior portions without abrading effect.

A collapsible partition or valve 14 is illustrated as being a disk having a middle zone to which opposite segments are hinged as flaps foldable upward to collapse the disk to less width, but hinge-stopped against downward swing beyond the plane of the disk, there being a rod-handle 28 on which the middle zone is hung loosely. The disk diameter, being larger than that of the bottle mouth, is intermediate between the edge-diameter and the wall-diameter of the ledge.

In Figure 1 the interior inverted ledge seat 12 may be formed by making the glass wall with a small exterior annular groove as at 18. This supplies ample stock for formation of the seat on the inner face of the wall, whence the neck may gradually diminish in size, in the conventional milk bottle shape, to the region of the external mouth.

The paper container 30 of Figure 3 has its inverted ledge 32 likewise formed without entailing any restriction of the neck passage from the mouth to and past the seat. This slight jog in the walls for constituting the seat 32 can be accomplished according to well known methods of handling and forming paper. However, the interior ledge may be formed in other ways.

The glass bottle likewise may have its interior ledge seat provided in other ways than by the exterior grooving of the walls as in Figure 1. In each case the bottle wall below the ledge has a smooth sweep upward of larger diameter than the ledge and terminated abruptly by the ledge which projects from it inward toward the axis.

The collapsible partition is not restricted to that which is illustrated, for that of the said Gray patent may be used, or one of many other constructions which have been devised and made known.

When the mid-zone of the disk is pushed endwise into the open top of the bottle, the edge of the bottle mouth turns the flaps of the disk on their hinges by a cam action, and the disk, thus collapsed, slips easily down through the cream to below the ledge. If one then draws upward on the handle 28, with the aft end of the mid-zone riding on the bottle walls, said aft end becomes arrested by the abrupt obstruction constituted by the ledge, and with that obstruction as a fulcrum the handle which is attached in a middle part of the mid-zone swings the fore end of that mid-zone up until it strikes the ledge on the other side of the axis of the bottle. During this swing of the mid-zone of the disk the flaps can fall by gravity so as to convert the disk into a plane, but, if they do not, they engage the ledge as they rise and are forced down by that by a sort of cam action, with the result that the plane disk comes to lie flat against the plane ledge seat, and constitutes a flow-barrier to the bottle contents which are below the ledge.

In operation, to pour out the cream, separately from the milk, in a bottle embodying the invention, having milk in its body with cream in the neck, one inserts the valve to below the valve seat and pulls it up against its seat. The valve collapses to go in easily, and flattens to seat tightly. Upon a tipping of the bottle to pour out cream the pressure of any milk, which may tend to flow out, causes the flattened disk to act as a check valve, preventing such flow. The operator needs only to hold the valve in place, not needing to remember to apply pressure.

The invention can be applied for other purposes, for example, to deliver a measured fraction of bottle contents, assuming that the bottle is made with inverted ledges at certain levels, which correspond to the desired divisions of the bottle content, as, for example, to pour a pint from a quart bottle. The advantage of this is manifest both in paper bottles and in glass bottles, for, although a graduation may be marked on the bottle to show the level to which contents are to be reduced, it is quite difficult when looking into an opaque bottle through its neck to tell whether its contents are at the same level as a mark that may have been made on the outside. The precision with which the ledge of the invention can be positioned, in the making of a bottle of any material, transparent or opaque, permits the pouring of the predetermined fraction with precision, as contrasted with the trial-and-error method otherwise necessary.

To remove the valve, the bottle may be slightly tilted and the valve be then let fall and pressed against the inclined wall under it. The curvature of the bottle walls folds the side segments of disk upward and inward so that, as the element is drawn toward and through the mouth, with sliding movement lengthwise of the segments, these edges fold further inward, by a sort of cam action of the round walls upon them.

This application is a continuation in part of my co-pending application Serial 36,524 filed August 16, 1935, which will be abandoned in favor of this present application.

I claim as my invention:

1. A device for separating and pouring contents in a bottle or the like container having at its top a mouth which is open endwise of the axis, comprising in combination an element having within the container, fixed in height on the side wall of the bottle at the distance from the mouth at which the separating is to occur, an annular surface lying substantially in a plane perpendicular to the axis and projecting toward the axis, abruptly with respect to the adjoining part of the container wall which is below it, constituting a downward facing ledge; a collapsible and expansible flow-barrier plate, adapted when collapsed to pass through the mouth and through the ledge annulus, and when expanded adapted to have its marginal portion overlap the annular ledge, thereby to constitute a partition seated against the ledge within the bottle, with bottle space for contents above and below this partition; and a handle for manipulating the plate to and from its said seat; the said wall below the ledge being a guide for the manipulating of the plate to said seat.

2. A device as in claim 1, further characterized by the side wall of the container above said downward-facing ledge being devoid of substantial inclination outward from the axis.

3. A device as in claim 1, in which the said element having the downward-facing ledge is a ring of material additional to the wall and adhering thereto.

JOHN B. NEAL.